United States Patent [19]
Murray et al.

[11] Patent Number: 5,844,146
[45] Date of Patent: Dec. 1, 1998

[54] FINGERPAD FORCE SENSING SYSTEM

[75] Inventors: Anne Marie Murray, Onalaska, Tex.; Richard M. Moore, Jr., Pittsburgh, Pa.; David Alan Bourne, Pittsburgh, Pa.; Melvin W. Siegel, Pittsburgh, Pa.

[73] Assignees: Amada America, Inc., Buana Park, Calif.; Amada Company, Ltd., Kanagawa, Japan

[21] Appl. No.: 741,553

[22] Filed: Oct. 31, 1996

Related U.S. Application Data

[63] Continuation of Ser. No. 338,095, Nov. 9, 1994, abandoned.
[51] Int. Cl.⁶ .................................................. G01L 1/24
[52] U.S. Cl. ............................. 73/862.043; 73/862.624; 73/862.041
[58] Field of Search ..................... 73/862.042, 862.043, 73/862.044, 862.06, 862.644; 340/470.1, 470.2

[56] References Cited

U.S. PATENT DOCUMENTS

| | | | |
|---|---|---|---|
| 3,438,251 | 4/1969 | Kloss | 73/862.624 |
| 3,654,616 | 4/1972 | Dunne et al. | |
| 3,890,552 | 6/1975 | Devol et al. | |
| 4,111,027 | 9/1978 | Bottomley | |
| 4,260,940 | 4/1981 | Engelberger et al. | |
| 4,309,600 | 1/1982 | Perry et al. | |
| 4,356,718 | 11/1982 | Makino | |
| 4,369,563 | 1/1983 | Williamson | |
| 4,455,857 | 6/1984 | Salvagnini | |
| 4,495,588 | 1/1985 | Nio et al. | |
| 4,501,135 | 2/1985 | Chivens et al. | |
| 4,509,357 | 4/1985 | Zbornik | |
| 4,517,653 | 5/1985 | Tsuchihashi et al. | |
| 4,521,685 | 6/1985 | Rebman | 250/229 |
| 4,571,694 | 2/1986 | Inaba et al. | |
| 4,602,345 | 7/1986 | Yokoyama | |
| 4,613,943 | 9/1986 | Miyake et al. | |

(List continued on next page.)

FOREIGN PATENT DOCUMENTS

| | | |
|---|---|---|
| 0301527 | 2/1989 | European Pat. Off. |
| 0335314 | 10/1989 | European Pat. Off. |
| 0355454 | 2/1990 | European Pat. Off. |
| 3110018 | 5/1991 | Japan |
| 3110022 | 5/1991 | Japan |
| 4309414 | 11/1992 | Japan |
| 9109696 | 7/1991 | WIPO |
| 9503901 | 2/1995 | WIPO |

OTHER PUBLICATIONS

Patent Abstracts of Japan, vol. 015, No. 298, Jul. 29, 1991, & JP–A–03 110 022.

Patent Abstracts of Japan, vol. 015, No. 298, Jul. 29, 1991, & JP–A–03 110 018.

Patent Abstracts of Japan, vol. 018, No. 239, May 9, 1994, & JP–A–06 031 345.

Patent Abstracts of Japan, vol. 015, No. 325, Aug. 19, 1991, & JP–A–03 124 318.

Ichikawa et al., Y., "A Heuristic Planner And An Executive For Mobile Robor Control", *IEEE Transactions on Systems, Man and Cybernetics*, vol. SMC–15, No. 4, pp. 558–563, New York, U.S.A. (Jul./Aug. 1985).

(List continued on next page.)

*Primary Examiner*—Ronald L. Biegel
*Attorney, Agent, or Firm*—Greenblum & Bernstein, P.L.C.

[57] ABSTRACT

A fingerpad force sensor system is disclosed which is useful for detecting process variations during manufacturing processes in which a plurality of force sensors are applied to the gripper of a robot in order to monitor shear forces applied to the workpiece held by the robot during, for example, sheet-metal bending manufacturing processes. Each sensor is encapsulated in rubber pads which are secured to the gripper of the robot such that they monitor the status of the workpiece during all phases of automated bending: material acquisition, material handling, machine loading and unloading.

17 Claims, 11 Drawing Sheets

U.S. PATENT DOCUMENTS

| | | |
|---|---|---|
| 4,640,113 | 2/1987 | Dieperink et al. . |
| 4,658,625 | 4/1987 | Koyama et al. . |
| 4,745,812 | 5/1988 | Amazeen et al. ............... 73/862.04 |
| 4,802,357 | 2/1989 | Jones . |
| 4,942,767 | 7/1990 | Haritonidis et al. . |
| 4,947,666 | 8/1990 | Hametner et al. . |
| 4,962,654 | 10/1990 | Zbornik . |
| 4,979,385 | 12/1990 | Lafrasse et al. . |
| 4,991,422 | 2/1991 | Sartorio . |
| 5,005,394 | 4/1991 | Sartorio et al. . |
| 5,007,264 | 4/1991 | Haack . |
| 5,009,098 | 4/1991 | van Merksteijn . |
| 5,012,661 | 5/1991 | Catti et al. . |
| 5,031,441 | 7/1991 | Jones . |
| 5,036,694 | 8/1991 | Farney et al. . |
| 5,042,287 | 8/1991 | Sartorio . |
| 5,058,406 | 10/1991 | Sartorio et al. . |
| 5,081,763 | 1/1992 | Jones . |
| 5,088,181 | 2/1992 | Jeppsson . |
| 5,092,645 | 3/1992 | Okada . |
| 5,146,670 | 9/1992 | Jones . |
| 5,298,964 | 3/1994 | Nelson et al. ............... 73/862.624 |
| 5,307,282 | 4/1994 | Conradson et al. . |
| 5,365,059 | 11/1994 | Savage ............... 73/862.624 |

OTHER PUBLICATIONS

Zussman et al., E., "A Planning Approach For Robot–Assisted Multiple–Bent Profile Handling", *Robotics and Computer–Integrated Manufacturing,* vol. 11, No. 1, pp. 35–40, Kidlington, Oxford, GB (Mar. 1994).

Huang et al., H., "Time–Optimal Control For A Robotic Contour Following Problem", *IEEE Journal of Robotics and Automation,* vol. 4, No. 2, pp. 140–149, New York, U.S.A. (Apr. 1988).

Bourne, David A., "Intelligent Manufacturing Workstations," which appeared in *Knowledge–Based Automation of Processes,* Session at the 1992 ASME Winter Annual Meeting, Nov. 1992.

Lozano–Perez, Tomas, "Automatic Synthesis of Fine–Motion Strategies for Robots," *The International Journal of Robotics Research,* vol. 3, No. 1, Massachusettes Institute of Technology (Spring 1984).

Stewart et al., David B., *Chimera II, Real Time Programming Environment,* Version 1.02, Carnegie Mellon University, Pittsburgh, PA (Oct. 1990).

Craig, John J., *Introduction to Robotics Mechanics and Control,* Second Edition, Addison–Wesley Publishing Company, Reading MA (1989).

Paul, R.G., "Problems and Research Issues Associated with Hybrid Control of Force and Displacement," *Proceedings of the IEEE International Conference on Robotics and Automation,* pp. 1966–1971 (1987).

Roger Allan, "Nonvision Sensors", *Electronic Design,* Jun. 27, 1985, pp. 103–115.

J.J. Carr, *Sensors and Circuits,* PTR Prentice Hall, Englewood, New Jersey, 1993, pp. 125–133.

Paolo Dario and Danilo De Rossi, "Tactile Sensors and the Gripping Challenge", IEEE Spectrum, vol. 22, No. 8, Aug. 1985, pp. 46–52.

P. Dario, M. Bergamasco, and A. Fiorillo, "Force and Tactile Sensing For Robots", NATO ASI Series, vol. F43, Sensors and Sensory Systems For Advanced Robots, Springer–Verlag, Berlin, 1988, pp. 153–185 No. 8, Aug. 1985, pp. 46–52.

Akira Nomura et al., "Two Dimensional Tactile Sensor Using Optical Method", IEEE Transactions On Components, Hybrids, and Manufacturing Technology, vol. 8, No. 2, Jun. 1985, pp. 264–268.

Patent Abstracts of Japan, vol. 017, No. 126, Mar. 17, 1993, & JP–A–04 309 414.

Hoermann, K., "A Cartesian Approach To Findpath For Industrial Robots", *NATO ASI Series,* vol. F29, pp. 425–450, Springler–Verlag Berlin Heidelberg, DE (1987).

Fink et al., B., "Schnelle Bahnplanung Fuer Industrieroboter Mit Veraenderlichem Arbeitsraum", *Automatisierungstechnik–At,* vol. 39, No. 6, pp. 197–200, 201–204, Munich, DE (Jun. 1991).

Shaffer et al., C.A., "A Real–Time Robot Arm Collision Avoidance System", *IEEE Transactions on Robotics and Automation,* vol. 8, No. 2, pp. 149–160, New York, U.S.A. (Apr. 1992).

Lee et al., C.T. "A Divide–And–Conquer Approach With Heuristics Of Motion Planning For A Cartesian Manipulator", *IEEE Transactions on Systems, Man and Cybernetics,* vol. 22, No. 5, pp. 929–944, New York U.S.A. (Sep./Oct. 1992).

O'Donnell et al., P.A., "Deadlock–Free And Collision–Free Coordination Of Two Robot Manipulators", *Proceedings of the 1989 IEEE International Conference on Robotics and Automation,* vol. 1, pp. 484–489, Scottsdale, AZ (May 1989).

Weule et al., V.H., "Rechnerintergrierte Fertigung Von Abkantteilen", *V.A.I.–Zeitschrift,* vol. 130, No. 9 pp. 101–106, Dusseldorf, W. Germany (Sep. 1988).

Reissner, V.J., "Innovationsschub Bei Rechnerintegrierten Umformsystemen", *Technische Rundschau,* vol. 85 No. 5, pp. 20–25, Bern, CH (Feb. 5, 1993).

Geiger et al., M., "Inferenzmaschine Fuer Ein Biegestadienplanungssystem", *Zwf Cim Zeitschrift Fur Wirtschaftliche Fertigung Und Automatisierung,* vol. 87, No. 5, pp. 261–264, Munich, DE (May 1992).

Database Dialog, Information Access Co., File 621, Access No. 0134529, *Communigraphics Inc:* "LVD Introduces New CNC/DNC/CAD/CAM Control System For Press Brakes At IMTS'86", & New Product Announcements, No. 0134529, Plainville, CT, U.S.A. (Jul. 1996).

An International Search Report for PCT/JP 95/02288.

An Invitation to Pay Additional Fees with a Partial International Search Report for PCT/JP 95/02289.

An International Search Report for PCT/JP 95/02290.

An International Search Report for PCT/JP 95/02291.

Murray, Anne M., A Fingerpad Force Sensor for Manipulating Sheet Metal, submitted to Dept. of Electrical and Computer Eng., Carnegie Mellon Univ., Pittsburgh, PA, (Aug. '93).

FIG. 8A
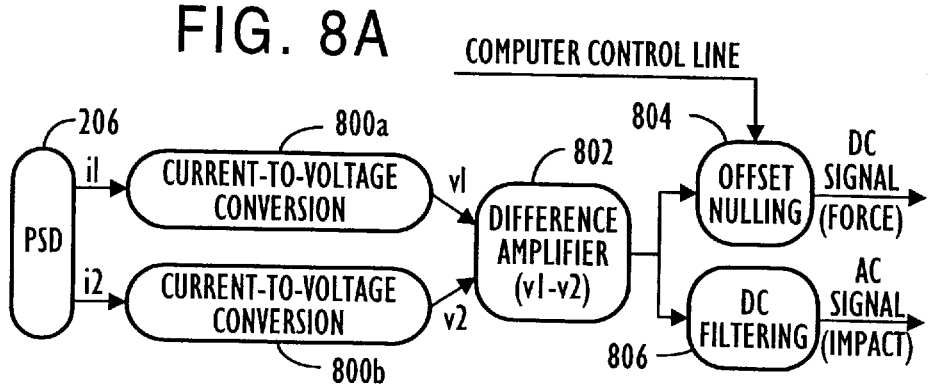
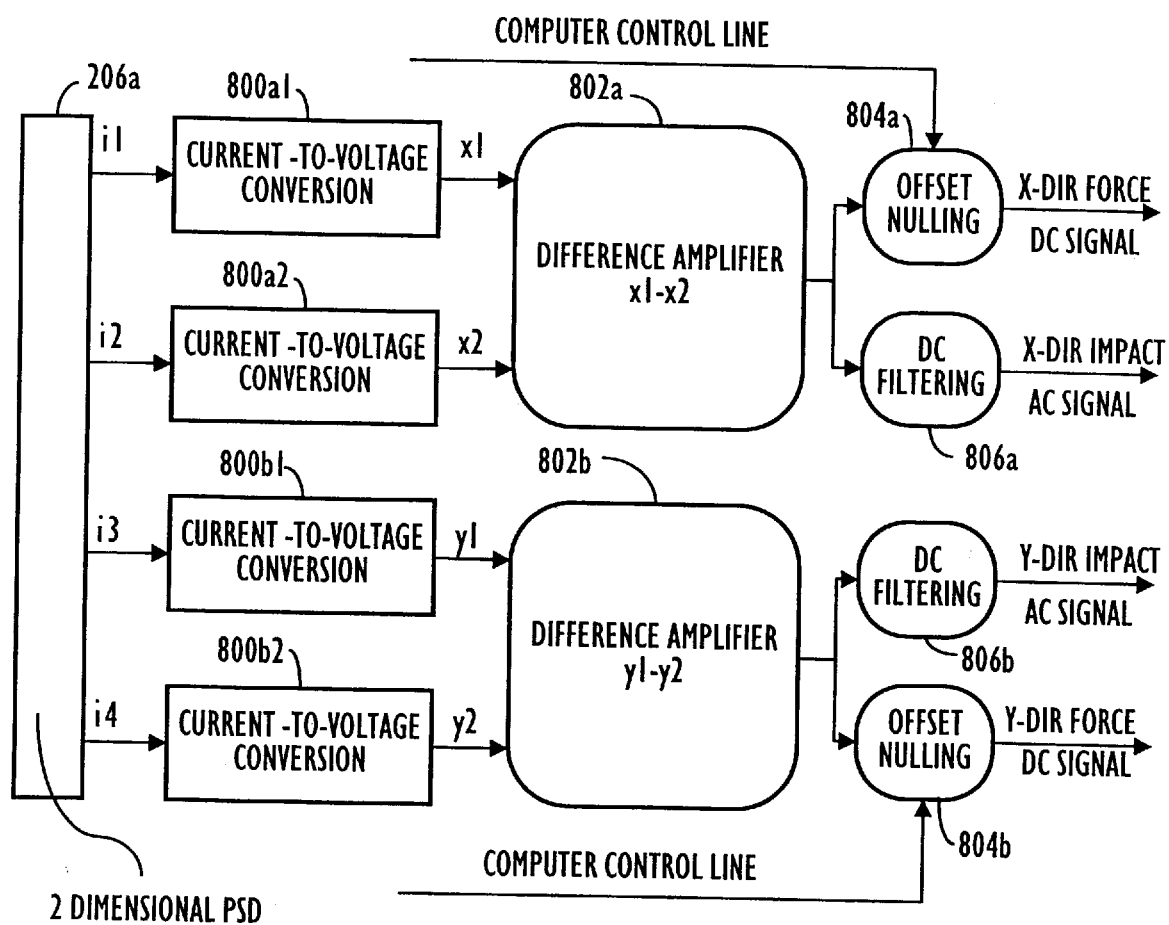
FIG. 8B

SENSOR FORCE READINGS

SENSOR FORCE READINGS

FINGERPAD FORCE SENSING SYSTEM

This application is a continuation of application Ser. No. 08/338,095, filed Nov. 9, 1994, now abandoned.

BACKGROUND OF THE INVENTION

1. Field of the Invention

The present disclosure is related to the disclosures provided in the following U.S. applications filed concurrently herewith: "Intelligent System for Generating and Executing a Sheet Metal Bending Plan", filed in the names of David Alan Bourne et al. (U.S. Ser. No. 08/338,113); "Methods and Apparatuses for Backgaging and Sensor-Based Control of Bending Operations", filed in the names of Richard M. Moore et al. (U.S. Ser. No. 08/388,153); and "Method for Planning/Controlling Robot Motion", filed in the names of David Alan Bourne et al. (U.S. Ser. No. 08/338,115); and the disclosures of all of these applications are expressly incorporated by reference herein in their entireties.

The present invention relates to a fingerpad force sensing system for providing electrical signals representative of the force of material in contact with a fingerpad force sensor. More particularly, the present invention relates to a fingerpad force sensing system which is used to provide an indication of the force applied to a planar object which is in contact with the fingerpad force sensor of the system.

2. Background and Material Information

In mass-production systems for fabricating products made from planar materials, such as, for example, sheet metal, there is a need for manufacturing the desired products quickly, accurately and at the lowest possible cost. Mass-production systems which produce large batches of a product are able to distribute the cost of errors and the set-up and fine tuning of the fabrication machine such that the cost per product produced is relatively low. However, there is a continuing emphasis on producing a product at the lowest possible cost.

The cost per product produced is even more important in small-batch and custom part manufacturing systems which do not have the economies of scale of the mass-production systems and, therefore, cannot spread the cost of errors and mistakes over the same large product batch sizes as the mass-production systems. Therefore, such small-batch and custom part manufacturing systems must utilize automated machines which manufacture the desired product correctly the first time in order to be cost effective and to produce the product at a competitive cost to other producers. Errors should be corrected either before or during production of the product. Nevertheless, it would still be desirable to be able to eliminate errors as much as possible when manufacturing a product, whether using a mass-production system with large batch sizes or a small-batch and custom part manufacturing system.

Typically, a majority of production errors in automated mass-production manufacturing systems occur because the manufacturing system is not able to adequately compensate for variations in the manufacturing process. One such variation, which will be discussed in connection with the example of an automated mass-production manufacturing system described herein, is the thickness of the sheet metal used in connection with the fabrication of sheet metal products. Since the manufacturing process variations are difficult to model before the actual manufacturing system is operational, sensors are used to detect and compensate for such manufacturing process variations in real time.

The fingerpad force sensor of the present invention can be used, in connection with, for example, an automated metal-bending work station that efficiently manufactures small-batch sheet metal parts described by computer aided design systems. The automated work station may include a process planner that selects the necessary punches, dies, grippers and sensors, determines the fabrication sequence and then generates the appropriate data for the software which operates the bending machine. After the process plan is formulated, a work station-based system provides real-time sensor-based control of the bending machine during the manufacturing process, while also recording the process history for later review by operators.

Using such an automated metal-bending machine without the fingerpad force sensor of the present invention creates several drawbacks. For example, since the original bending machine is programmed through teach-playback methods, a considerable amount of time is required in order to fine tune and adjust the bending machine to produce the desired part. In addition, even after the system has been fine-tuned, failures still occur during the manufacturing of parts. Such failures include, for example, collisions with the punch tools and poor bends due to part misalignment. Generally, such failures occur because the bending machine does not have the intelligence to accurately know the position and orientation of the workpiece.

There are many reasons for the part position uncertainty in prior art systems. They include the mechanical slop present in the loading mechanism for the bending machine, the loss of part position information when the robot gripper releases the workpiece during bending operations, slippage of the workpiece in the robot gripper during handling and flexing of the workpiece during handling. The present invention addresses such workpiece position uncertainty by augmenting the sheet metal bending machine system with fingerpad force sensors.

The fingerpad force sensor system of the present invention overcomes the above-described shortcomings of the art by detecting process variations which occur in, for example, the automated sheet metal bending manufacturing system described above. Several of those fingerpad force sensors are embedded in the gripping pads of the robot which forms part of the automated sheet metal bending manufacturing system. When external forces are applied to the sheet metal workpiece being held by the robot gripper, the deformation of the rubber pads produces a change in the outputs of the sensors. The sensors are designed as an integral part of the robot's gripper and therefore travel with the workpiece. The instant design thus allows the manufacturing system to monitor the "status" of the workpiece at any time during all phases of automated bending: material acquisition, material handling, machine loading and unloading. In each of these areas, there are problems of dynamic forces between the sheet metal and the gripper that must be actively sensed and controlled. In that manner, the sensors used with the present invention enable the manufacturing system to align the workpiece at the loading station and the press brake, to detect unplanned collisions between the workpiece and the manufacturing system and to also detect imminent workpiece slippage. Such imminent workpiece slippage in the robot gripper occurs when the robot accelerates large parts too quickly.

SUMMARY AND OBJECTS OF THE INVENTION

In view of the foregoing, it should be apparent that there still exists a need in the art for a method of and apparatus for a force sensor system which can readily be used in both large and small batch automated manufacturing systems to detect critical process variations which occur in such systems in order to correct deviations in, for example, the workpiece manipulation process based upon the data provided by the sensing system. It is, therefore, a primary object of this invention to provide a method of and apparatus for providing a force sensor system which detects process variations in automated manufacturing systems and which has particular application for automated sheet metal bending machine systems.

More particularly, it is an object of this invention to provide a fingerpad force sensor system which forms a part of the gripping pads of a robot and which detect variations in the forces acting on a workpiece during, for example, a metal-bending manufacturing process.

Still more particularly, it is an object of this invention to provide a fingerpad force sensor system for manipulating a workpiece which utilizes simple and reliable electronic circuitry which does not require frequent alignment nor costly components.

Another object of the present invention is to provide a reliable and relatively inexpensive process variation detector mechanism for use in detecting and overcoming various manufacturing process variations which occur in a metal-bending manufacturing process.

A still further object of the present invention is to provide a system for monitoring the forces acting on a sheet metal workpiece during a metal-bending manufacturing process so as to correct for various manufacturing process variations such as workpiece misalignment during the manufacturing process, workpiece collisions with various components of the manufacturing system and workpiece slippage in the robot gripper.

Briefly described, these and other objects of the invention are accomplished by providing a set of sensors which are secured to the gripper of a robot for providing force and impact information for the workpiece held by the gripper. Each of the sensors is formed from a deformable rubber pad which includes an LED aligned opposite a position-sensitive detector such that, when the rubber pad and LED combination is deformed by a shear force, the output of the position-sensitive detector changes, thus providing an output current which is proportional to the effect of the force applied to the workpiece.

The currents output by each of the position-sensitive detectors are separately converted to a voltage and the difference between the voltage calculated. That difference voltage signal is then applied to both a computer controlled offset nulling circuit and a DC filtering circuit to produce a DC signal representative of the amount of force experienced by the sensor and an AC signal representative of the impact of that force experienced by the sensor.

BRIEF DESCRIPTION OF THE DRAWINGS

FIGS. 8A–8B are schematic block diagrams of the signal conditioning electronics which may be used with the fingerpad force sensor of the present invention;

DETAILED DESCRIPTION OF THE PREFERRED EMBODIMENTS

Figure 1:
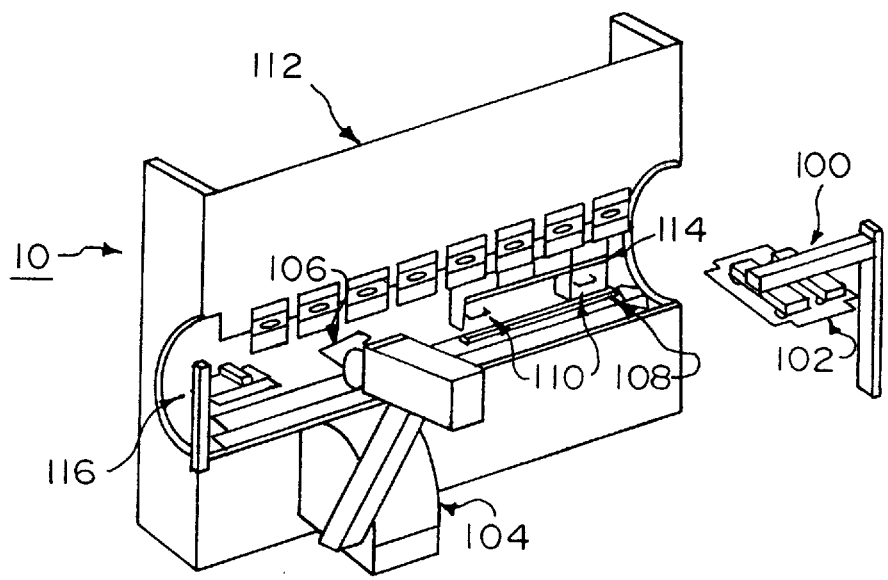
FIG. 1 is a diagram illustrating the various components which are typically utilized with an automated sheet metal bending machine.

Referring now in detail to the drawings wherein like parts are designated by like reference numerals throughout, there is illustrated in FIG. 1 an automated sheet metal bending machine system 10 in which a material loader/unloader 100 is used to pick up a workpiece 102. The workpiece 102 is then taken from the material loader/unloader 100 by a five degree of freedom robot 104. More specifically, the gripper 106 of the robot, to which the fingerpad force sensor system of the present invention is secured, as will be discussed later herein, is used to grip the workpiece 102 and move it into position along the die rail 108 and against the backstops 110 of the press brake 112. Once properly positioned, the punch tools 114 are used to process the workpiece 102. In the event that the robot 104 needs to adjust its grip on the workpiece, the repositioning gripper 116 may be utilized.

As has been discussed previously in detail, various manufacturing process variations occur when utilizing the automated sheet metal bending manufacturing system 10 and other such similar types of manufacturing systems. For example, the workpiece 102 may be misaligned when acquired by the robot 104 at the material loading and unloading station 100 or when the robot 104 places the workpiece 102 into the press brake 112 for bending. Also, collisions occasionally occur between the workpiece 102 and the press 112, the robot 104 or other obstacles. An additional common manufacturing process variation is the slippage between the workpiece 102 and the gripper 106 of the robot 104, which can occur when the robot 104 accelerates too quickly while gripping a large workpiece 102.

Figure 2:
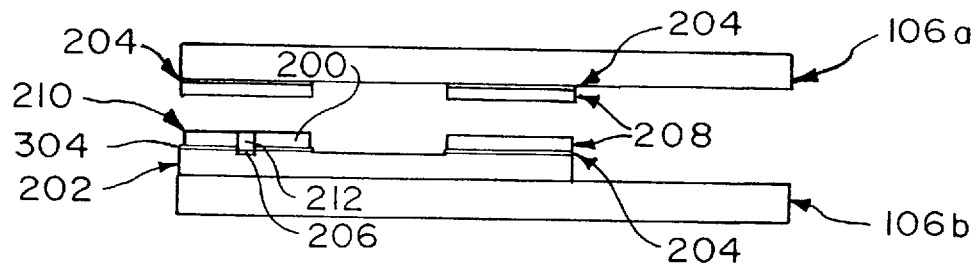
FIG. 2 is a diagram showing a cross-section of the fingerpad force sensor of the present invention.
Figure 3:
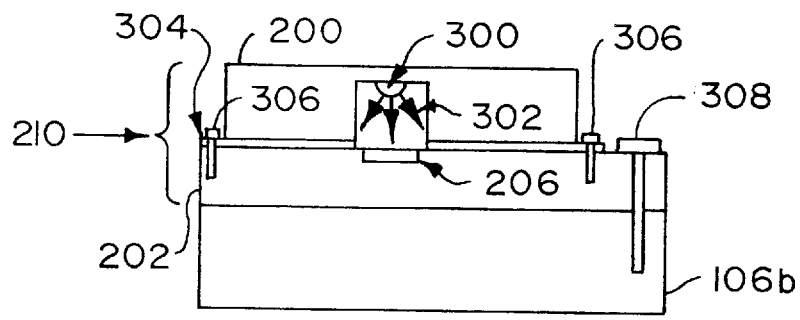
FIG. 3 is an enlarged view of a portion of the fingerpad force sensor of FIG. 2.

Therefore, the fingerpad force sensor of the present invention as shown, for example, in FIGS. 2 and 3, has been developed in order to provide real time compensation for those manufacturing process variations. In particular, the fingerpad force sensor system of the present invention will assist the robot 104 in properly aligning the workpiece 102, detecting and/or recovering from a collision between the workpiece and various components of the automated sheet metal bending system 10 and to prevent slippage of the workpiece 102 while in the gripper 106 of the robot 104.

Figure 10:
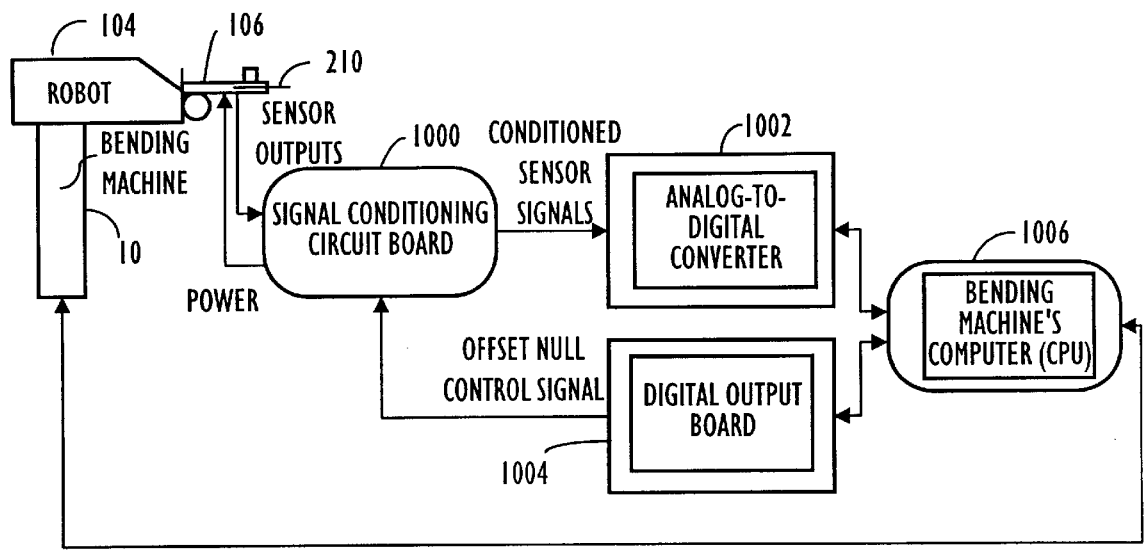
FIG. 10 is a block diagram illustrating the integration of the fingerpad force sensor of the present invention with an automated metal-bending machine.

The foregoing goals can be achieved by integrating the fingerpad force sensing system hardware and software with that of the automated sheet metal bending machine 10 The hardware of the fingerpad force sensor system, that is, the fingerpad force sensors 210 and the associated signal condition circuit board 1000, interface with the computer 1006 of the sheet metal bending machine by means of an analog-to-digital converter board 1002 and a digital output board 1004. The digital output board 1004 allows the bending machine's computer 1006 to control the offset nulling functionality of the force sensor's signal conditioning circuit board 1000. The integration of the fingerpad force sensor system of the present invention with an automated metal bending machine is shown in FIG. 10.

Figure 11:
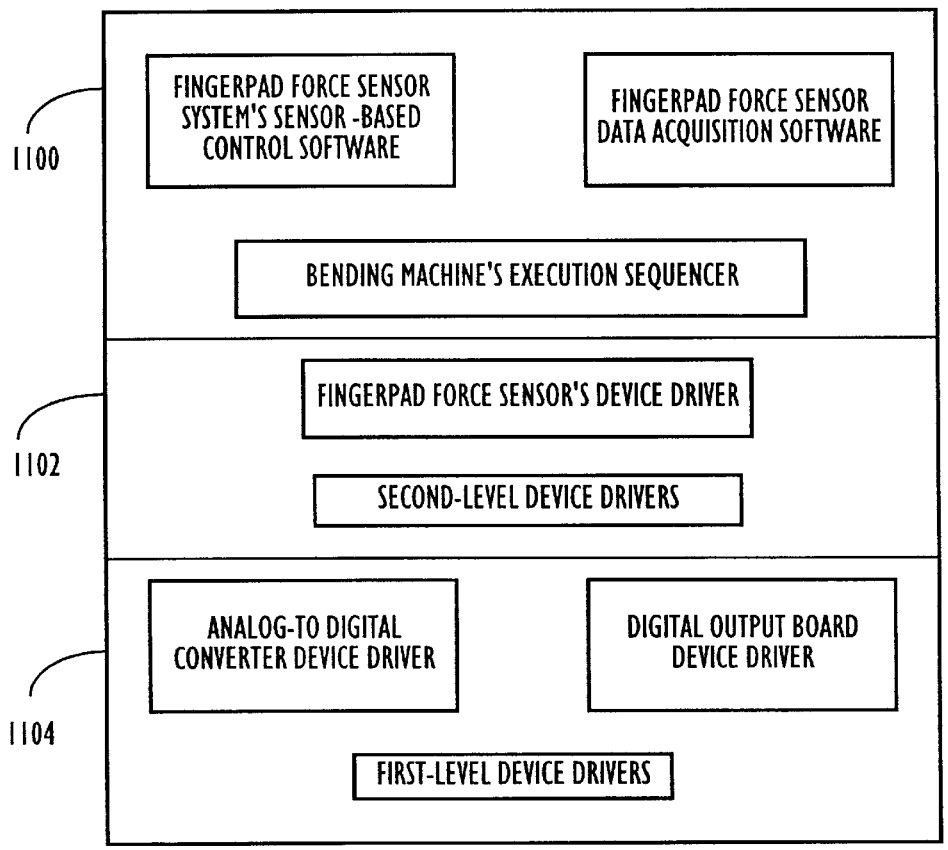
FIG. 11 is a diagram showing the hierarchial support software for the fingerpad force sensor of the present invention.

The fingerpad force sensor's software includes routines that permit the bending machine's computer 1006 to read the sensor output values, to convert the sensor output voltage values to equivalent force units, to control the offset nulling module of the signal conditioning circuit board 1000, and to perform sensor-based control strategies. As illustrated in FIG. 11, the sensor software consists of a three-level hierarchy. At the lowest level is the first-level device drive software 1104 for the analog-to-digital board 1002 and the digitable output board 1004. The first-level device drivers define the commands that allow the bending machine's computer 1006 to communicate with the analog-to-digital board 1002 and the digital output board 1004. The next level 1102, called the second-level device driver software, contains the device driver for the fingerpad sensor system. The sensor system's second-level device driver embodies the routines that allow the bending machine's computer 1006 to communicate with the signal conditioning circuit board 1000 of the fingerpad force sensor, including routines to read and convert the sensor outputs and to activate the offset nulling module of the signal conditioning board 1000. The second-level device driver builds upon the commands defined by the first-level device driver. The third level of software 1100 contains the real time application routines that are embedded in the bending machine's overall application software (e.g., the execution sequencer).

The fingerpad force sensor's application routines include sensor-based control strategies for force sensing, as well as data acquisition routines. As shown in FIG. 11, the application program uses the software routines defined in the second-level device drivers as building blocks for the more elaborate application routines. This is a common software paradigm which is described, for example, in *CHIMERA II Real Time Programming Environment: Program Documentation*, by David B. Stewart, Donald E. Schmitz, and Pradeep K. Khosla, released in 1991 by Carnegie Mellon University, at pages 154–167.

During the manufacturing process, it is possible that a bent workpiece 102 may collide with the punch tool 114 when the robot 104 tries to remove it from the press brake 112. That collision causes a large and abrupt change in the sensor signals, which can be used to initiate a sensor-based control routine to help the bending machine recover from the collision. The sensor routine can also be used to interrupt the robot program such that the robot 104 moves away from the punch tool 114. That prevents damage to the workpiece 102, the robot 104, the punch tool 114 and the sensors 210. The sensor routine may then notify the process planner of the error and can then be used to adjust the path of the robot 104 by utilizing the sensor's information concerning the impact force direction in order to recover from a collision between the punch tool 114 and a bent workpiece 102. Also, the robot 104 can be instructed to move along the newly adjusted path using feedback obtained from the sensors 210 in order to "feel" its way out of the press brake 112. Thus, the fingerpad force sensor system of the present invention uses both the detection of the error during the manufacturing process and a sensor-based control scheme for compensating for a sensed error in order to prevent such an error from recurring.

The fingerpad force sensor of the present invention, as discussed above, is mounted to the gripper 106 of the robot 104. In that manner, one set of sensors can be utilized for numerous force sensing applications. The gripper 106 of the robot 104 is an ideal place of the mounting of the force sensors since forces are transferred from the workpiece 102 to the gripper 106 when the workpiece 102 interacts with its environment. Also, the set of the force sensors 210 travels with the workpiece 102 and is always present to measure the forces which affect the workpiece 102, and especially those which occur during the procedure of loading the workpiece 102 into the press brake 112 for bending.

Each of the force sensors 210 is formed as integral component of the robot's parallel-jaw gripper 106 and forms, in effect, a fingerpad for the robot 104. As shown in FIGS. 2 and 3, the fingerpad force sensor of the present invention is fabricated by mounting one or more position-sensitive detectors 206 (only a single position-sensitive detector is shown for purposes of clarity) in an aluminum mounting plate 202. The aluminum mounting plate 202 is then secured to the bottom half 106b of the gripper 106 of the robot 104 using the existing screw holes (not shown) of the gripper 106.

A rubber pad 200 having a recess 212 cut in it is mounted to a thin sheet metal base plate 304 by, for example, an adhesive. The base plate 304 has a hole cut in it to allow the light from the LED 300 to reach the position-sensitive device 206. The rubber pad 200 and its base 304 are secured to the top surface of the aluminum mounting plate 202 with screws 306. In addition, another rubber pad 208 may be likewise mounted to the aluminum plate to make the gripping surface even. In a similar manner, a number of other rubber pads 208 may be mounted with an adhesive to the sheet metal base plates 204 which are in turn fastened to the gripper top 106a by any suitable means, such as with screws (not shown). The light from the LED 300 of the rubber pad 200 can be centered on the position-sensitive detector 206 by moving the rubber pad 200 and its base plate 304 within the confines of enlarged screw through holes by which the rubber pad base-plate is attached to the aluminum plate 202. Alternatively, the aluminum mounting plate 202 can be designed in such a way that small set screws can be inserted into its sides to push the position-sensitive device 206 into a centered position relative to the sensor pad LED 300. The aluminum mounting plates 202 are mounted to the bottom gripper 106b by suitable devices, such as the screw 308 shown in FIG. 3.

Using the foregoing construction, access to the sensors 210 is readily obtained, since the mounting plate 202 can be quickly removed from the gripper bottom 106b. Therefore, the gripper 106 of the robot 104 need not be removed from service for long periods of time in order to repair the sensors 210.

FIG. 3 shows an enlarged portion of FIG. 2 which includes the rubber pad 200 having a recess 212 formed therein, as well as the position-sensitive detector 206 mounted on its aluminum plate 202. The force sensor 210 is formed from, for example, a one-dimensional position sensitive detector having a sensitive area of preferably 1 mm×3.5 mm. Preferably, a two-dimensional position-sensitive detector is utilized. The one-dimensional position-sensitive detector may be Part No. S3274-01 available from Hamamatsu Photonics KK of Japan. The two-dimensional position-sensitive detector may be Part No. S4744, also available from the same company.

The infrared light emitting diode (LED) 300 which is embedded in the rubber pad 200 in that portion of the rubber pad 200 which bridges the recess 212 may preferably be a miniature 2 mm wide LED Part No. LD261-5 for use with the one-dimensional sensor and a miniature 1 mm wide LED, Part No. SFH405-3, for use in the two-dimensional sensor. Both of those components are available from Siemens Components, Inc. of Cupertino, Calif.

Figure 4:
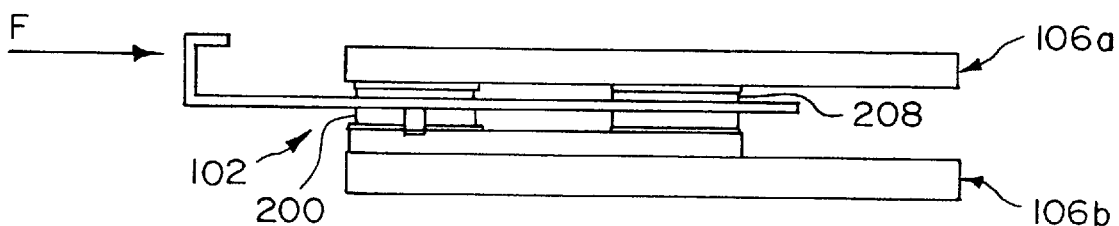
FIG. 4 is a cross-section of the fingerpad force sensor of the present invention under a shear load.
Figure 5:
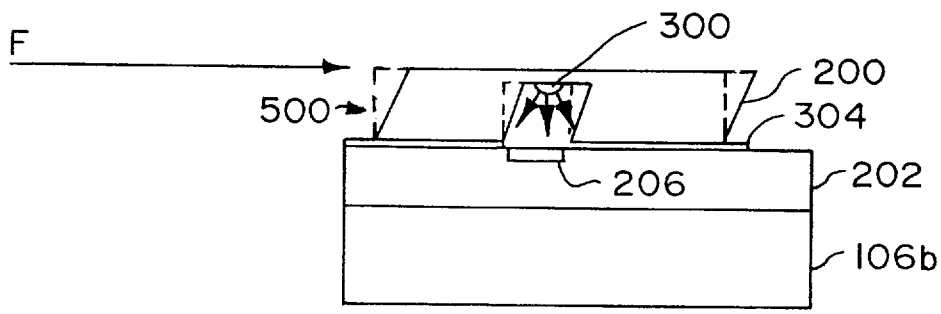
FIG. 5 is an enlarged view of a portion of the fingerpad force sensor of FIG. 4 under the same shear load.

The sensor 210 is designed such that when an external force acts on a workpiece 102 held by the gripper 106, the rubber pad deforms, thus causing LED 300 to shift along the sensitive area of the position-sensitive detector 206. The position-sensitive detector 206 detects the shifting the light source, as shown in FIGS. 4 and 5, and the electrical output from the position-sensitive detector 206 is affected. FIG. 4 is a diagram of a cross-section of the instant force sensor 210 under a shear load F which issue applied to the left-hand side of the workpiece 102 which is gripped by the rubber pads 208 and 200. For purposes of simplicity, not all of the remaining components shown in FIG. 2 are shown in FIG. 4.

FIG. 5 is an enlargement 500 of a portion of FIG. 4, including the rubber pad 200 which carries the LED 300, showing the skewed relationship between the LED 300 and the position-sensitive detector 206 when the shear load F is applied to workpiece 102 as shown in FIG. 4. The changes in the output from the position-sensitive detector 206 can then be utilized to determine the amount of force experienced by the workpiece 102 and its direction of application. It is preferred that the sensors 210 have a measurement resolution of at least 1 pound and a of range at least 10 pounds in each sensing direction.

A typical rubber pad 200 may preferably measure ½ in.×1 in.×⅜ in. in size for the 1-D sensors (and 1×1×⅜ for 2-D sensors) and have a recess 212 cut into it for the LED 300 as well as a channel 302 for the wires connected to the LED 300. An epoxy adhesive may be utilized to embed the LED 300 into the rubber pad 200. The process of embedding the LED 300 into the rubber pad 200 involves removing as little rubber material as possible from the pad 200 and utilizing only a small amount of epoxy cement such that the mechanical properties of the rubber pad 200 do not change substantially. Preferably, at least two one-dimensional sensors 210 are utilized on the front end of the gripper 106.

Figure 6:
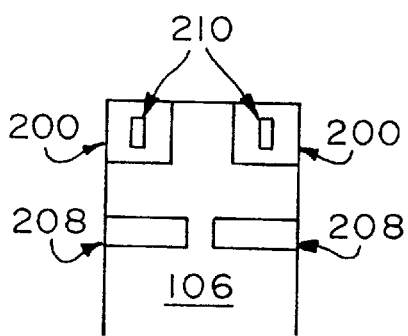
FIG. 6 is a diagram illustrating a top view of the front-end of a robot gripper utilizing a fingerpad force sensor with one dimensional sensors.

FIG. 6 shows a diagram of a top view of the front end of the gripper 106. While the instant invention is described with the sensors 210 being secured to the gripper bottom 106b and the rubber pads 208 being secured to the gripper top 106a, it should be understood that the sensors 210 could alternatively be secured to the gripper top 106a while the rubber pads 208 could be secured to the gripper bottom 106b or the sensors 210 could be secured to both the top and bottom of the gripper 106.

Figure 7:
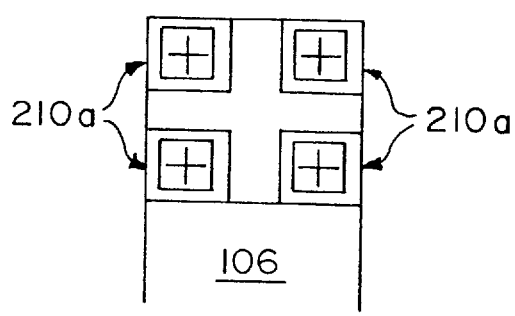
FIG. 7 is a diagram illustrating a top view of the front-end of a robot gripper utilizing a fingerpad force sensor with two dimensional sensors.

FIG. 7 shows a diagram of a top view of the front end of the gripper 106 illustrating the location and orientation of four two-dimensional force sensor 210a. The four two-dimensional sensors 210a are mounted to a mounting plate in a similar manners described in connection with the mounting of the sensors 210 to the mounting plate 202 in FIG. 2. By using the four two-dimensional sensors 210a and measuring the differences between the outputs from the top and bottom sets of sensors 210a it may be possible to distinguish between shear and normal forces being applied to the workpiece 102. The direction and magnitude of the forces detected by the top and bottom sensors is similar when shear forces are applied in the plane of the sensors 210a, while the magnitude and direction differs when a normal force is applied to the workpiece 102. The typical shear forces monitored by the sensors 210 and 210a assure 1 lb to 10 lbs.

The rubber used to form the pads 200. and 208 may preferably be made from neoprene rubber having a 45 Shore A hardness rating. It has been found that such rubber pads exhibits both hysteresis and a creep characteristics, which effect the response time and recovery time of the sensor. The creep characteristic of the rubber pad 200 also results in a slow settling time for the sensor's output when the gripper 106 of the robot 104 first closes. The slow settling time of the sensor output can be reduced by pre-loading the sensor with a compression force greater than the typical nominal gripping force of 300 psi. Alternatively, a look-up table can be developed which contains the average change in the sensor's output for each different applied load. Such a table would include the changes that occurred during both the loading and unloading of the sensor, that is, changes due to both creep and recovery. Such a look-up table could be utilized with software used in connection with the output signals produced by the instant fingerpad force sensor system.

The hysteresis and creep characteristics of the rubber pad also affect the bandwidth of the sensor. Such undesirable characteristics can be minimized by utilizing a rubber material made with more natural rubber and few reinforcing fillers. For example, a rubber pad can alternatively be made from castable urethane, also having a 45 Shore A hardness rating, by pouring liquid urethane into a mold into which the LED 300, its associated wires and the pad base-plate 304 have already been fixed in place. The rubber pad is then formed as the urethane cures. That method of manufacturing the sensor 210 minimizes the variability between LED-embedded rubber pads and ensures that the LED is located in the center of the rubber pad and is perpendicular to the position-sensitive detector 206. Liquid urethane is available from, for example, Conap, Inc., of Olean, N.Y. under the Part No. CONATHANE TU-500.

Figure 12:
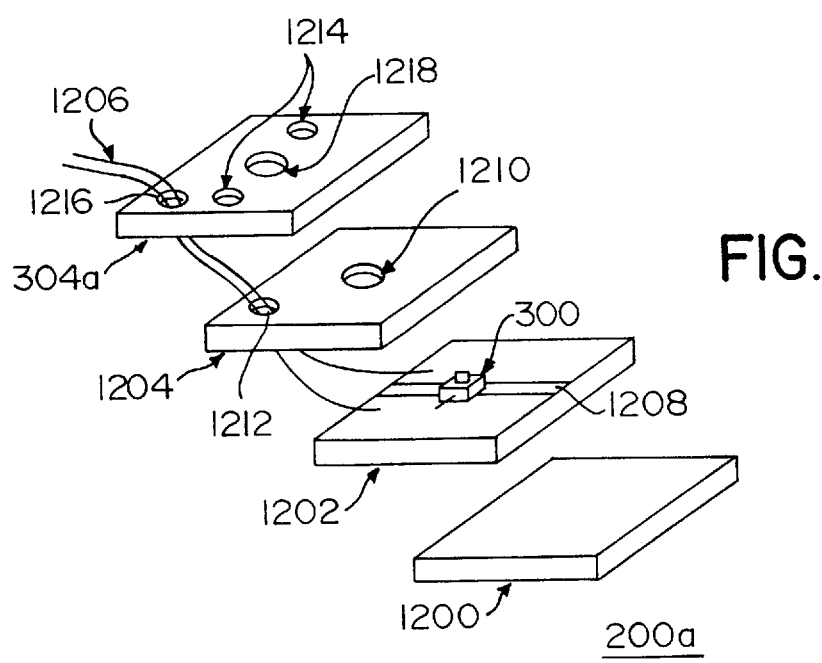
FIG. 12 is a diagram illustrating a preferred embodiment of a pad for the fingerpad force sensor of the present invention shown upside down.

FIG. 12 shows an alternative and preferred sensor pad design for use with the fingerpad force sensor system of the present invention (shown upside down). This design offers several improvements over the previously described LED-embedded rubber pad. Its improvements include easier fabrication, more accurate placement of the LED 300 in the sensor pad, and better shear displacement under a load. Instead of placing LED 300 in one solid piece of rubber as with the sensor pad 200 of FIG. 2, this alternative approach uses three layers of material to form the sensor pad 200a. The three layers are formed from a cork-rubber pad 1200, a copper surface printed circuit board (PCB) 1202, and a rubber pad 1204 made of natural gum rubber.

The cork-rubber pad 1200 provides a good gripping surface and absorbs the oils used on the sheet metal parts moved by the robot 104. The dimensions of the cork-rubber pad are preferably 1"×1"×⅟16". The copper surface printed circuit board 1202 holds the LED 300 and connects the LED 300 to power and ground sources through the wires 1206. A line 1208 is etched away from the copper surface of the PCB 1202 in order to electrically isolate the board into two copper sections (one section for power and other for ground). The LED 300 is then snugly fitted into a hole on the copper side of the printed circuit board 1202. The leads of the LED 300 are then soldered to the copper board one lead to each side. The wires 1206 are soldered to each copper section to supply the power and ground signals for the operation of the LED 300. The dimensions of the copper PCB 1202 board are preferably 1"×1"×1/16".

The third layer consists of a natural gum rubber pad 1204 of 45 Shore A hardness having a hole 1210 cut out of its center to allow the light from the LED 300 to pass through to the position-sensitive detector 206, 206a and a second hole 1212 near the corner of the pad 1204 for the wires 1206 to feed through to the copper PCB 1202. The dimensions of the rubber pad 1204 are preferably 1"×1"×1/8".

The sensor pad 200a is formed by placing the three layers 1200–1204 together using a suitable adhesive. More specifically, the cork rubber pad 1200 is attached to the non-copper side of the printed circuit board layer 1202 and the rubber pad 1204 is attached to the copper side of the printed circuit board layer 1202. The natural gum rubber side of the layered sensor pad 200a is then attached to a sheet metal base plate 304a with suitable adhesive. The base plate 304a has a hole 1218 cut in its center to allow the light from the LED 300 to pass through to position-sensitive detector 206, 206a, screw holes 1214 on each end for attaching the base plate 304a to the sensor's aluminum mounting plate 202, and a fourth hole 1216 near its corner for the wires 1206 to feed through to copper plate 1202.

FIG. 8A shows a schematic diagram of a one-dimensional force sensor signal conditioning circuit which may be used to convert the photo-current output signals of the position-sensitive detectors 206 into voltage signals. The force sensor signal conditioning circuit produces two signals for each sensor, a DC-level signal for measuring forces applied to the sensor and an AC signal for detecting collisions.

Each of the one-dimensional sensitive detectors produces two output currents i1 and i2 which are fed respectively to first and second current-to-voltage converters 800a and 800b, which convert those currents to voltage values v1 and v2. Those output voltages v1 and v2 are fed to a difference amplifier 802 which, by subtracting the voltage v2 from the voltage v1, determines the relative light position of the LED 300 on the photo-sensitive detector sensitive area 206. The output from the difference amplifier 802 is fed to both an offset nulling module 804 and to a DC filtering module 806. The offset nulling module 804 is connected to be controlled by the bending machine computer. The offset nulling module 804, under computer control, functions to remove the large DC component of the difference output (v1–v2) which occurs when the gripper 106 closes and compresses the rubber pads 200. The DC filtering module 806 functions to pass only the transitions in that difference voltage for purposes of collision detection. All of the stages 800–806 also function to amplify the signals which are input to them. Each of the force sensors 210 utilizes a respective force sensor signal conditioning circuit such as that shown in FIG. 8.

Where two-dimensional sensors 210a, as shown in FIG. 7 are utilized, then the circuitry shown in FIG. 8A is modified accordingly. The modifications to the circuit shown in FIG. 8A are minimal for the two-dimensional (2-D) position-sensitive device (PSD) 206a since its operational properties are similar to the one-dimensional (1-D) PSD 206. For this type of 2-D PSD, the circuitry in FIG. 8A is duplicated two times (once for each sensing direction) and for each module the amplification gains and capacitor values are adjusted. Such circuitry is shown in FIG. 8B.

Figure 9A:
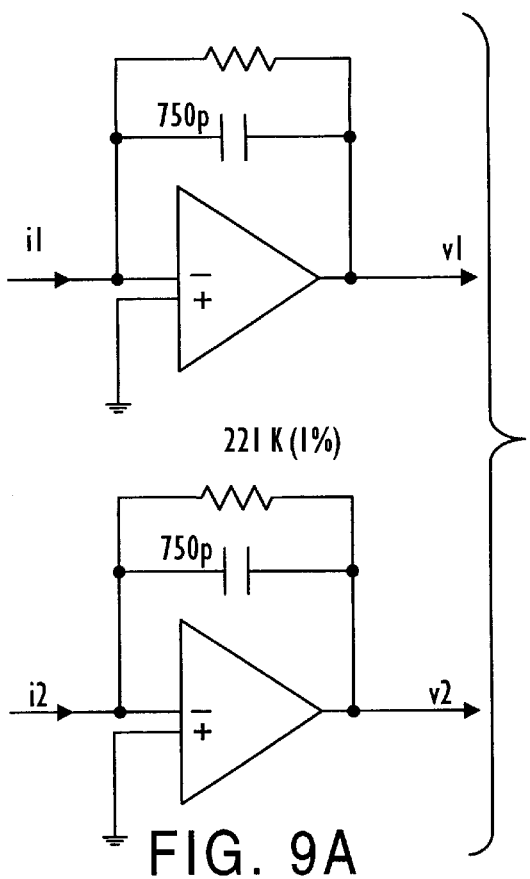
FIGS. 9A–9D are electrical schematic diagrams of circuitry suitable for use as the signal conditioning electronics shown in FIG. 8.
Figure 9B:
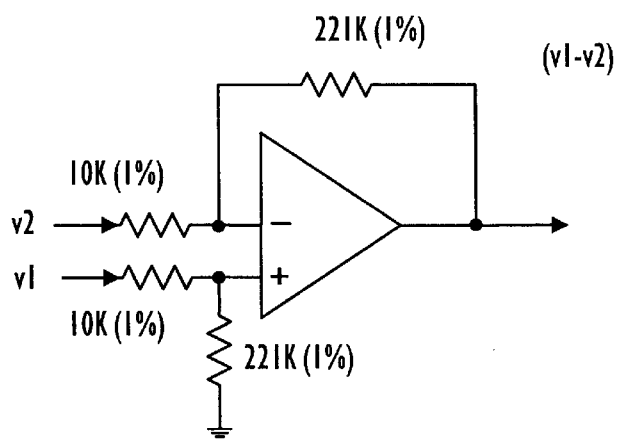
Figure 9C:
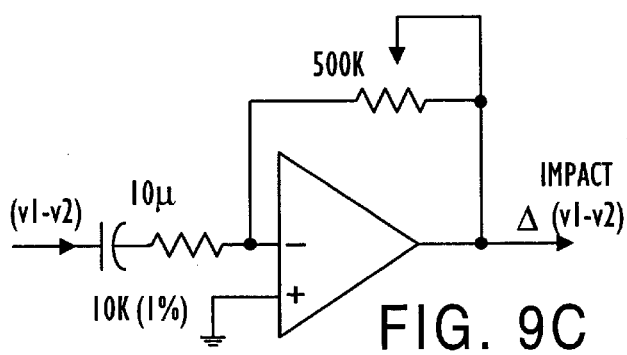
Figure 9D:
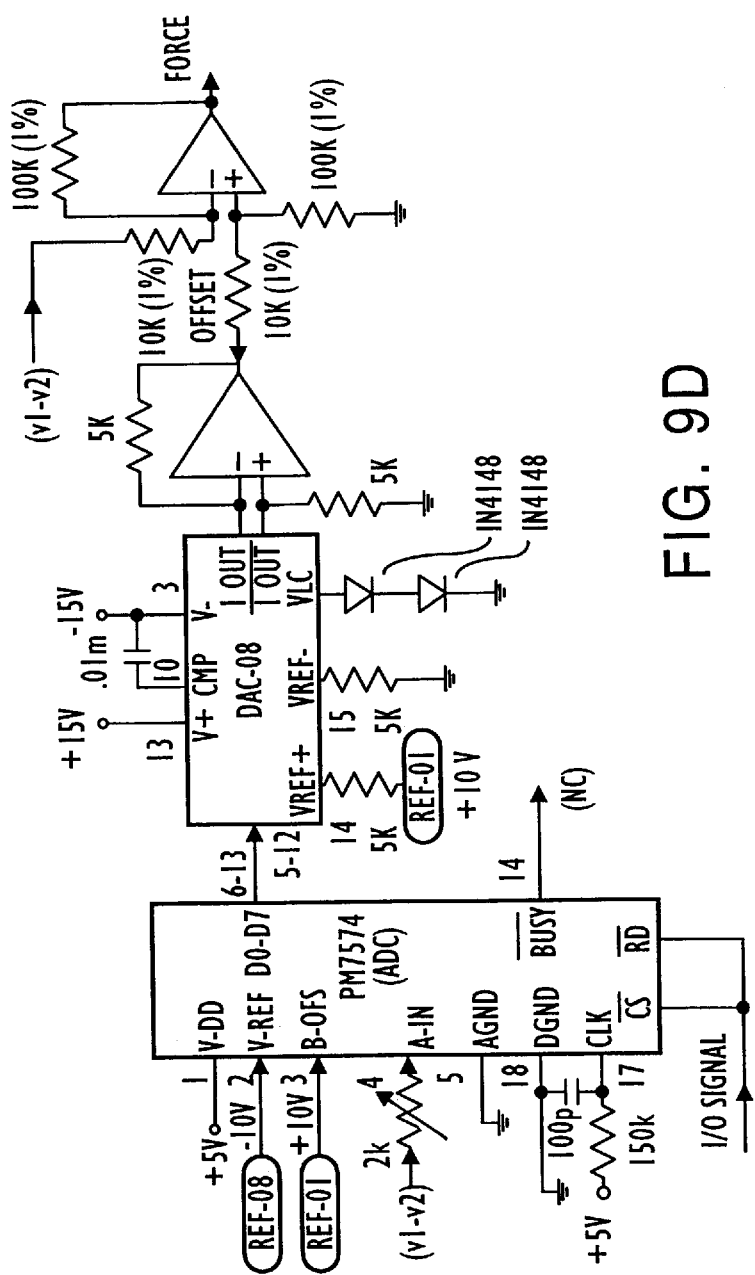

Specific circuitry which can be used with the current-to-voltage converters 800 is shown in FIG. 9A; circuitry for use as the differential amplifiers 802 is shown in FIG. 9B; circuitry for use as the DC filtering modules 806 is shown in FIG. 9C; and circuitry for use as the computer-controlled offset nulling models 804 is shown in FIG. 9D.

As discussed above, the fingerpad force sensing system of the present invention is useful for correcting workpiece misalignment at the loading station and press brake, for detecting unplanned workpiece collisions and for detecting imminent workpiece slippage. Each of those applications and a suggested sensing strategy is described below and illustrated in Tables 1–3. In each of the descriptions which follow, the gripper 106 of the robot 104 is equipped with four two-dimensional force detectors 210a, as shown and described in connection with FIG. 7.

The first application which will be discussed is that of the alignment of the workpiece at the loading station. The loader/unloader 100 picks up an unbent workpiece 102 with its suction cups and feeds sheet workpiece 102 to the robot 104 for bending, in a known manner. Although the workpieces 102 are usually aligned in their bin before the loader/unloader 100 picks them up, positional information may be lost due to mechanical imperfections in the loading mechanism. The workpiece 102 thus passed to the robot 104 will be skewed. If the misalignment of the workpiece is not corrected, then a crooked bend will result and the workpiece 102 will have to be discarded as scrap material.

By correcting the mechanical imperfections in the loader/unloader 100, workpiece position uncertainty can be corrected. Alternatively, an L-shaped bracket, as shown in Table 1, can be used to align the workpiece 102 at the loading station 100. By using the force feedback information of the fingerpad force sensor system, the robot 104 can fit a corner of the workpiece 102 into the corner of the alignment bracket, whose position is accurately known by the bending machine 112. After matching the corners, the degree of misalignment is determined by calculating the difference between the robot's position and orientation before and after aligning the workpiece 102. A position and orientation offset value is then added to all other robot moves throughout the manufacturing process in order to correct for the initial workpiece misalignment. Correction of the workpiece misalignment at the loading station thus minimizes or eliminates the necessity for realignment of the workpiece 102 at the press brake 112 for each bend.

FIGS. 13A–13E illustrate a five-step alignment procedure and the forces indicated by the sensors 210a during the procedure while accomplishing the alignment of a corner of the workpiece 102 with the corner of the alignment bracket. After the robot 104 acquires the workpiece 102 from the loader 100, it rotates the workpiece 102 in a clockwise direction and then moves the workpiece in the +y direction until contact is made with the bracket (see, e.g., FIG. 13A). The robot 104 initially rotates the workpiece 102 clockwise to ensure that the lower left corner of the workpiece 102 touches the bracket. The x-direction and y-direction force signals generated by each of the four sensors 210a indicate that contact has occurred. Specifically, the resultant force signals for each of the four sensors 210a will be in a clockwise orientation when the lower left corner of the workpiece 102 first contacts the alignment bracket.

It should be noted that in the discussion of this task, it is assumed that the pivot point for the force moment is located in the center of the mounting plate of the force sensors 210a. That also assumes that the compressive force acting on the four rubber pads which form part of those four sensors 210a is the same and that the rubber pads all have the same contact surface area. In the event that the gripper 106 used with the fingerpad force sensor system of the present invention has a compressive force which is greater for the rear pad than for the front pads, because of the gripper design, the pivot point would be further back towards the center of the two rear sensors, but the overall results as described herein are the same.

Figure 13A:
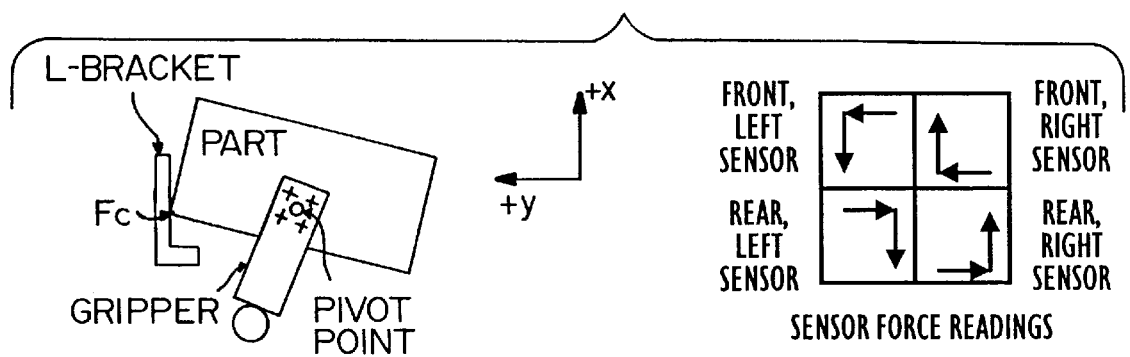
FIGS. 13A–13E illustrate, in accordance with an aspect of the invention, a five-step alignment procedure for aligning the corner of a workpiece with the corner of a bracket.
Figure 13B:
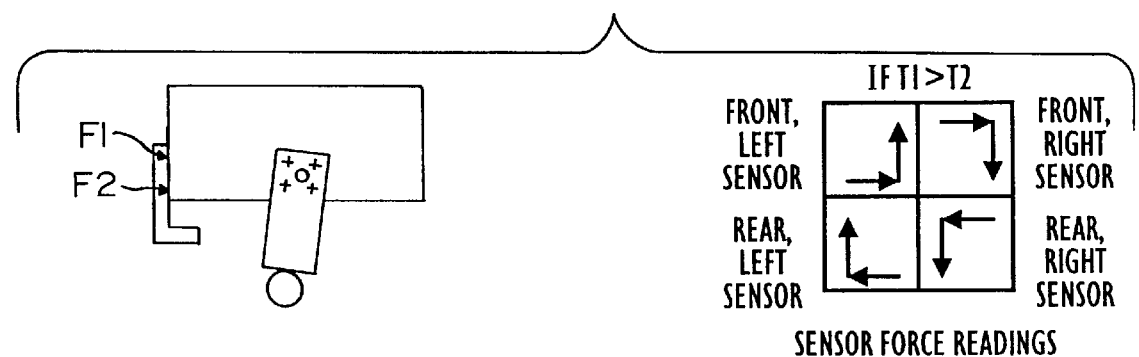

As shown in FIG. 13B, after contact of the workpiece 102 has been made with the bracket, the robot 104 rotates the workpiece 102 in a counter-clockwise direction around the contact point until the side of the workpiece 102 is in full contact with the left side of the bracket. After such contact has occurred, the sensor readings will indicate one of three possibilities. First, the moment forward of the pivot point is greater than the moment below the pivot point, such that the sensors 210a read resultant forces in a clockwise direction. Second, the opposing moments about the pivot point are equal, so that all four of the sensors 210a read a force in the −y direction and possibly a small force in the +x direction. The third possibility is that the moment behind the pivot point is greater than the moment in front of the pivot point, so that the sensors 210a read a resultant force in the counter-clockwise direction greater than the initial contact forces. By making the initial contact point at the lower left hand corner of the workpiece 102, the line contact forces with the workpiece and bracket sides can be differentiated, since the force readings generated by the fingerpad force sensing system of the present invention will change direction or will be in the same direction with an increased magnitude.

Figure 13C:
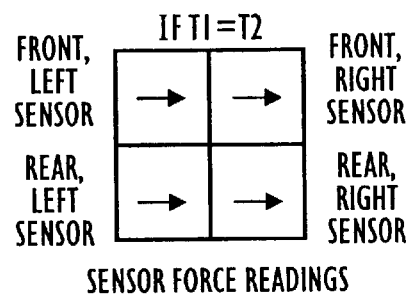
Figure 13D:
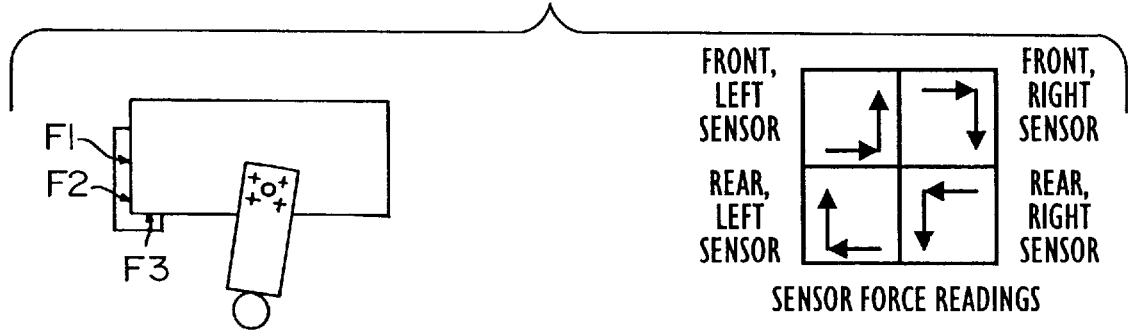

Once line contact is achieved, the robot 104 then rotates the workpiece 102 clockwise or counter-clockwise, as necessary, in order to cancel the opposing moments acting on the workpiece 102 (see, e.g., FIG. 13C). This step establishes the orientation of the workpiece 102 and makes it easier to detect contact with the corner of the bracket in the next step. After the moments have been cancelled, the robot 104 moves the workpiece 102 back, while maintaining contact with the side of the bracket, until the workpiece 102 touches the corner of the bracket (see, e.g., FIG. 13D). Contact between the bracket and the workpiece 102 is indicated by a clockwise resultant force reading generated by the sensors 210a. This step establishes the position of the workpiece 102. As previously discussed, an offset value corresponding to the position and orientation of the workpiece 102 is then used throughout the manufacturing process to compensate for the loading process variation.

Figure 13E:
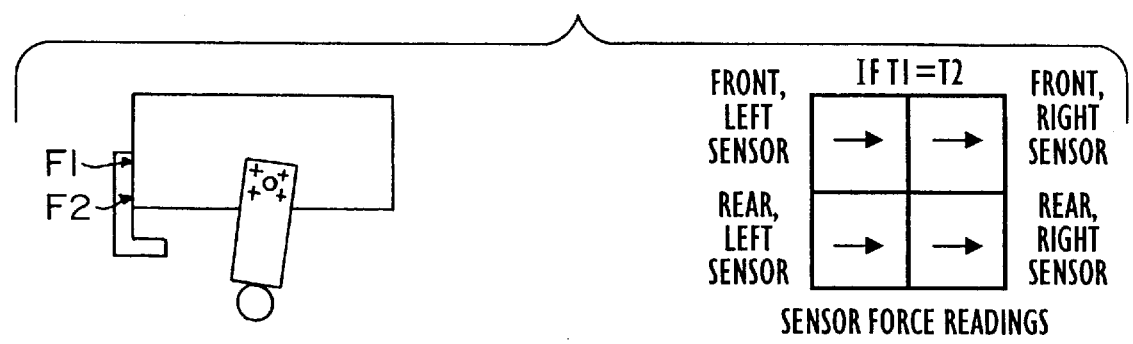

As shown in FIG. 13E, the final step in the alignment procedure, is to push the workpiece 102 away from the corner before the robot 104 executes its next move. This step removes any force moments acting on the workpiece and prevents the rubber pads which form part of the sensors 210a from "springing back" when the robot 104 eventually moves the workpiece 102 away from the alignment bracket.

Figure 14A:
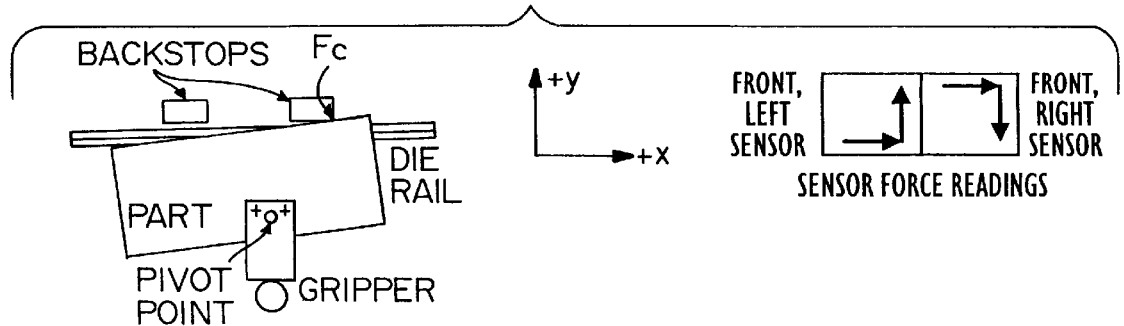
FIGS. 14A–14E illustrate loading procedures and the steps for aligning a workpiece with the backstops of a press brake, according to another aspect of the invention.
Figure 14B:
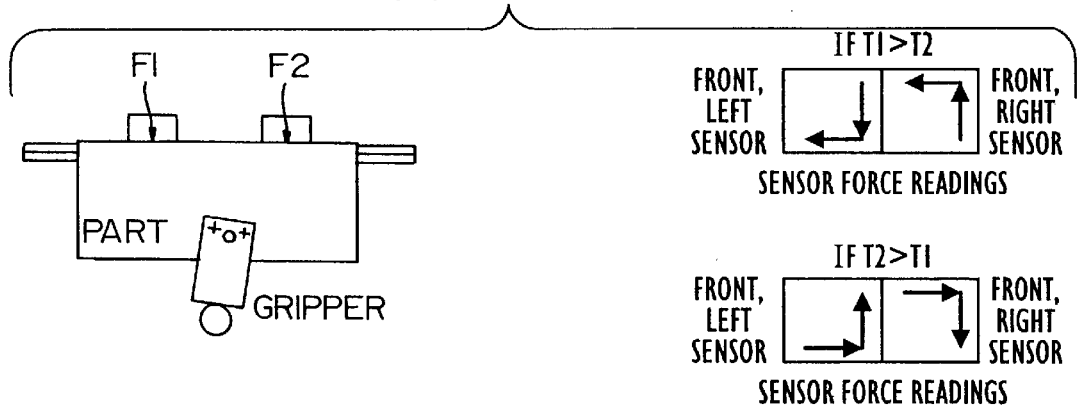
Figure 14C:
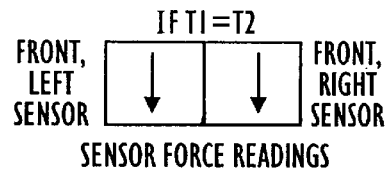
Figure 14D:
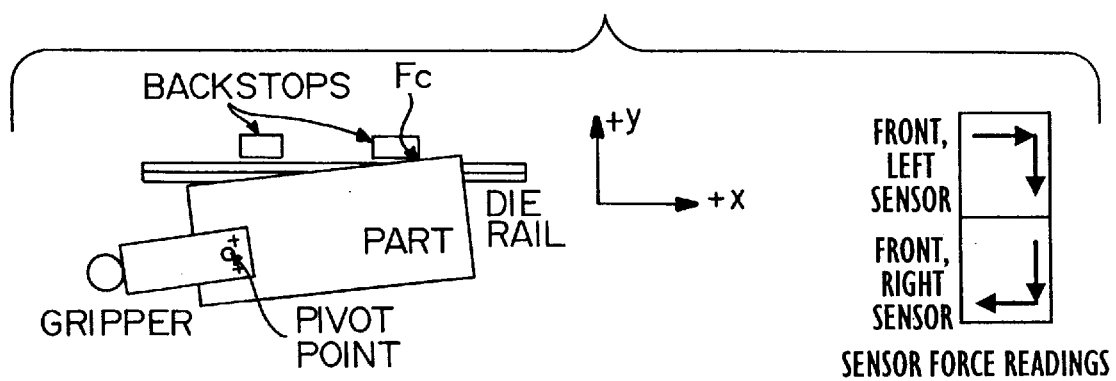
Figure 14E:
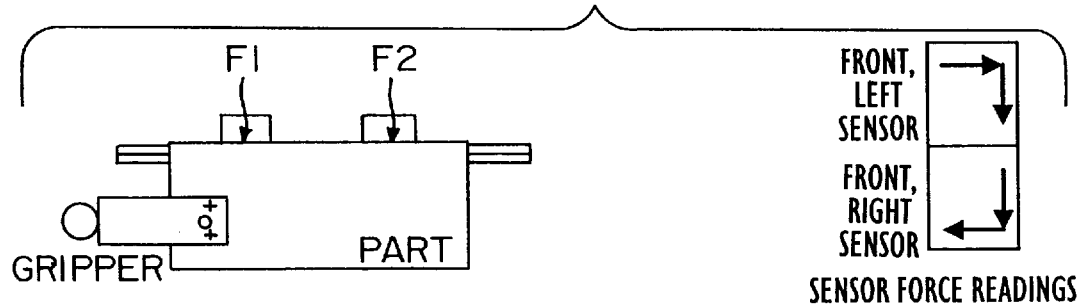

FIGS. 14A–14C illustrate the three steps and the resultant sensor force readings which are used to align the workpiece 102 in the press break 112 such that the robot 104 places the workpiece 102 snugly against the backstops 110 of the press break 112. Once the workpiece 102 is properly aligned in the press brake 112, the workpiece is bent. A straight bend is desired. The steps for aligning the workpiece 102 to the backstops 110 of the press brake 112 are similar to alignment task described above in connection with the loading station 100. This tasks differs, however, because a workpiece 102 can be loaded into the press brake 112 in two ways. The first way to load a workpiece 102 into the press brake 112 is with the gripper 106 perpendicular to the desired bend line. That type of loading is called front loading. The second type of loading is that in which the gripper 106 is parallel to the bend line. That type of loading is termed side loading. The steps for accomplishing the front loading are shown in FIGS. 14A–14C, while the steps for accomplishing side loading are shown in FIGS. 14D–14E. Although each loading technique requires a slightly different sensing strategy, the goal is the same, that is, to place the side of the workpiece 102 against the backstops 110 of the press back 112.

Since the gripper 106 of the robot 104 often holds the workpiece 102 to be bent over a flange, only the front two sensors of the four sensors 210a shown in FIG. 7 can effectively be used to align the workpiece 102 against the backstops 110 since the workpiece 102 does not extend over the two rear most sensors. Therefore, the following description of the steps of aligning the workpiece 102 in the press brake 112 against the backstops 110 will be described utilizing only the information available from the front two sensors 210a mounted on the gripper 106.

Since the sensing strategy and force sensor readings for alignment of the workpiece 102 at the press brake 112 are similar to those at the loader/unloader 100, such readings will not be discussed in detail again.

The front loading alignment procedure has three steps, which are illustrated in FIGS. 14A–14C. First, the robot 104 moves the workpiece 102 forward into the press brake 112 until the workpiece touches the backstops 110. If the workpiece is misaligned, it will either touch the right corner of the right backstop, thus producing a clockwise moment, or the left corner of the left backstop, thus producing a counter-clockwise moment. By analyzing the pattern of forces read by the sensors 210a, the point of contact can be determined, since the position of the backstops 110 is known. The robot 104 then rotates the workpiece 102 about the point of contact until it touches both backstops 110. Finally, the robot 104 adjust the position of the workpiece 102 until the opposing moments acting on workpiece 102 are within the desired tolerance. The workpiece 102 is thus aligned and the press brake 112 can then proceed to bend the workpiece.

The two steps for accomplishing the side loading of the workpiece 102 into the press brake 112 as shown in FIGS. 14D–14E. First, the robot 104 rotates the workpiece 102 towards the press brake 112 in order to ensure that the workpiece strikes the backstop 110 farthest from the gripper 106. The robot 104 then moves the workpiece 102 into the press brake 112 until the workpiece 102 touches the corner of the farthest of the two backstops 110. Finally, the robot 104 rotates the workpiece 102 about the point of contact until the workpiece 102 touches the second backstop 110. The robot 104 only manipulates the workpiece 102 until it touches both backstops 110. The robot 104 does not attempt to balance the opposing moments applied to the workpiece 102. Since contact of the workpiece 102 with both backstops 110 is indicated only by an increase in the measured force since there is no change in the force direction, supplementary contact sensors may also be utilized on each backstop 110.

As discussed above, the fingerpad force sensing system of the present invention can also be utilized to detect impacts. That is desirable since such detection can prevent damage to the robot 104, the punch and die tools 108, 114 and the workpiece 102. In addition, the detection of an unplanned collision indicates that there is an error in the process planner software of an unanticipated process variation. Such errors, after being detected, can then be corrected before beginning the manufacturing process again with a new workpiece. It is therefore desirable to detect unplanned collisions with the workpiece 102 and, if possible, recover from those collisions by backing away from the impact.

Figure 15:
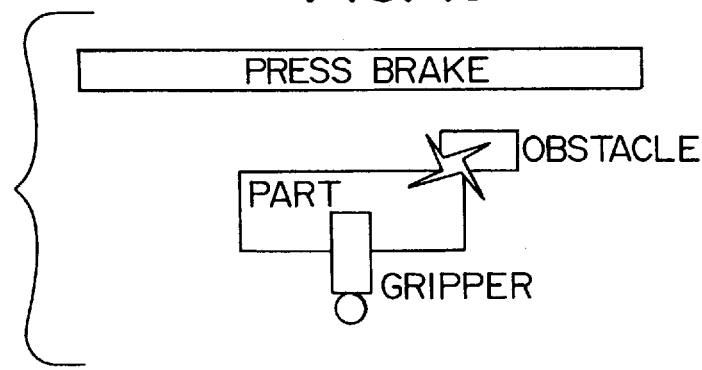
FIG. 15 illustrates an exemplary unplanned collision between a workpiece and an obstacle.

FIG. 15 shows an example of an unplanned collision between the workpiece or part 102 and an obstacle. In order to detect such an unplanned collision, the information generated by the sensors 210a in response to impact forces utilized. First, a threshold force value is set that is well above the noise level of the sensors 210a and the nominal sensor readings produced by mechanical vibrations in the manufacturing system. If a force grater than the threshold is registered by the sensors 210a during moves in free-space, then an impact has occurred. When an impact or collision occurs, the sensor-based plan overrides the current robot 104 motion plan and, using the impact direction information obtained from the sensors 210a, moves the robot 104 away from the obstruction. Then, depending upon the robot motion in progress at the time of the collision, the sensors 210a may or may not be used to finish the desired robot move.

As shown in FIG. 15, the right corner of the workpiece 102 has incurred an unplanned collision with an unknown obstacle in what would normally be a "safe" or open space region with no known obstacles. The robot motion planner can then use the information generated by the sensors 210a to move the workpiece 102 over further to the left and then to try the front loading procedure again. Alternatively, if the workpiece 102 collides with the punch tools 114 while the robot 104 tries to extract it from the press brake 112, then the signals produced by the sensors 210a can be used to help the robot 104 "feel" its way out of the press brake 112.

Alternatively, another approach can be used to avoid severe damage to the robot 104 and then press brake 112 As shown and described in connection with FIGS. 8A and 8B, two types of signals are produced by each force sensor's signal conditioning circuit; namely a DC-level output for measuring forces and an AC signal that passes only the transitions in the force readings. That AC output can be used for impact detection by setting a threshold force value for a severe collision. When the AC signal generated by the sensors 210a reaches preset thresholds, it can be used to trigger a system interrupt to stop the robot 104. Thus, the AC signal can be used as a safeguard that generates a hardware interrupt to shut down the robot 104 and the bending machine 112 upon the detection of a severe collision.

The fourth detection application discussed above is that of detecting the workpiece 102 slipping within the gripper 106 of the robot 104 while the robot is rotating quickly. Such slippage occurs when the force acting on the workpiece 102 exceeds the frictional force between the rubber pads of the fingerpad force sensing system and the workpiece 102. if a workpiece 102 slips in the gripper 106, then information regarding the position of the workpiece 102 and its orientation is lost. The fingerpad force sensing system of the present invention can be used to prevent workpiece slippage by warning the robot system of an impending slippage condition. This warning mechanism can be used to control the speed or acceleration of the robot 104. For example, in order to operate efficiently, the robot 104 may be instructed to the move workpiece 102 as fast as it can until the sensors 210a generate a signal which is used to instruct the robot to decrease its speed since the workpiece 102 may be about to slip.

The mechanism for detecting imminent workpiece slippage is similar to that discussed in connection with the detection of an impact. A force threshold that is below the nominal frictional force between the rubber pads and the sheet metal workpiece 102 may be used. When the sensors 210a register a force at or above that threshold, the workpiece 102 is about to slip and the robot 104 is warned/instructed to slow down.

Figure 16:
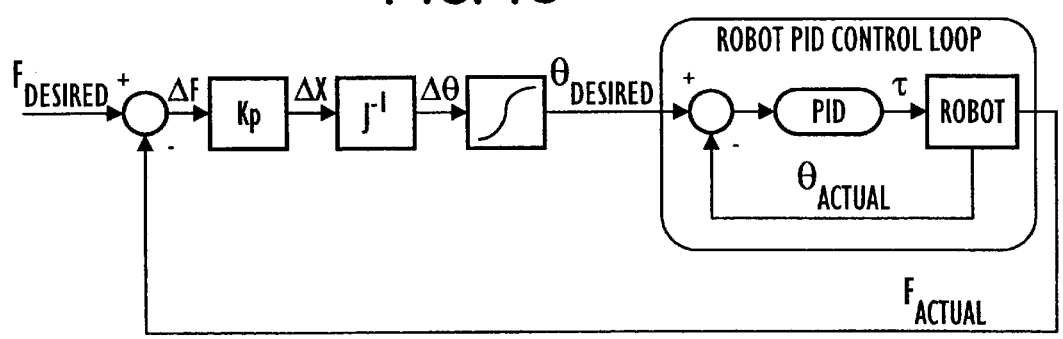
FIG. 16 illustrates an exemplary position-based proportional force control scheme, in accordance with an aspect of the invention.

The information generated by the fingerpad force sensor system of the present invention may be used in an open-loop system within the position-based control system of the robot 104. For example, during the alignment tasks as discussed above, the robot 104 is moved a small increment and then the values of the sensors 210a are read. Based on the signals generated by the sensors 210a, the next move of the robot 104 is determined. Alternatively, the information generated by the sensors 210a can be tied into the control loop of the robot 104 in order to improve the effectiveness of the sensors 210a and the response of the robot 104 to contact forces. For that purpose, a force-based control loop can be placed around the position controller of the robot 104. That can be accomplished by relating the desired incremental force with the desired incremental robot position through a proportionality constant. Such a scheme is termed a position-based proportional force control scheme, an example of which is shown in FIG. 16. This system operates as follows. When the motion of the robot 104 is constrained, for example, and the robot has pushed the workpiece 102 up against the backstops 110 of the press back 112, the robot controller can switch over to the force control scheme to assist the robot 104 in adjusting its movements until the desired force reading is reached. Such a method is desirable because it provides a natural way of implementing the application tasks, minimizes the possibility of missing an important event, such as an impact, and also eliminates the possibility of applying excessive forces to the workpiece 102.

It is also desirable to have the flexibility of simultaneously using a force controller in directions of constrained motion, that is, directions in which there is contact of the workpiece with a fixed structure, such as the backstops 110, and a position controller in directions of free motion, that is, directions in which there is no physical contact between the workpiece 102 and any other structure except the gripper 106. Such a scheme is called a hybrid position-force controller and is illustrated and described in *Introduction to Robotics: Mechanics and Control* by J. J. Craig, 2nd edition, published by Addison-Wesley of Reading, Massachusetts in 1989. However, as described in an article entitled "Problems and Research Issues Associated with Hybrid Control of Force and Displacement", *Proceedings of the IEEE International Conference on Robotics and Automation*, by R. P. Paul, Published in 1987, at pages 1966–1971, when using either control mode the force and position should be monitored for unexpected changes. Such changes could indicate a problem in the robot procedure.

Although only a preferred embodiment is specifically illustrated and described herein, it will be appreciated that many modifications and variations of the present invention are possible in light of the above teachings and within the purview of the appended claims without departing and intended scope of the invention.

What is claimed:

1. A fingerpad force sensor system for detecting shear forces applied to a workpiece, said system comprising:

a robot having a gripper for holding said workpiece;

at least one fingerpad force sensor affixed to said gripper such that it is positioned between said gripper and said workpiece in order to experience a shear force experienced by said workpiece, each said at least one fingerpad force sensor including a two-dimensional position-sensitive detector, comprising a piece of deformable planar material and a light emitting source that is attached to said piece of deformable planar material, said light emitting source emitting a light that is detected by the position-sensitive detector when said shear force is experienced by said workpiece; and each said at least one fingerpad force sensor being constructed such that it produces at least two output signals representative of the magnitude and direction of said shear force.

2. The fingerpad force sensor system of claim 1, wherein four of said fingerpad force sensors are affixed on one side of said gripper, each approximately equidistant from a central point on said one side of said gripper.

3. A fingerpad force sensor system for detecting shear forces applied to a workpiece, said system comprising:

a robot having a gripper for holding said workpiece;

at least one fingerpad force sensor affixed to said gripper such that it is positioned between said gripper and said workpiece in order to experience a shear force experienced by said workpiece; and each said at least one fingerpad force sensor being constructed such that it produces at least two output signals representative of the magnitude and direction of said shear force, wherein each said at least one fingerpad force sensor comprises a piece of deformable planar material having a recess formed therein, a light source affixed in said recess in such a manner that light is emitted primarily in a direction towards an opening of said recess, and a position-sensitive detector positioned to receive said light emitted by said light source.

4. The fingerpad force sensor system of claim 3, further including a base plate in which said position-sensitive detector is recessed and to which said piece of deformable planar material is affixed.

5. The fingerpad force sensor system of claim 4, wherein said piece of deformable planar material is affixed over said position-sensitive detector such that said at least two output signals of said position-sensitive detector vary when said shear force is applied to said piece of deformable planar material.

6. A method for sensing the application of a shear force to a workpiece held by a gripper of a robot, said robot having at least one fingerpad sensor affixed to said gripper such that said fingerpad force sensor is positioned between said gripper and said workpiece in order to experience a shear force experienced by said workpiece, said method comprising:

exerting a shear force on said workpiece held by said gripper; and sensing deformation of said fingerpad force sensor in response to said shear force experienced by said workpiece by providing a deformable planar material carrying a light emitting source which is positioned to emit light to be received by a fixed position-sensitive detector which generates at least one output signal representative of a location on a surface of said fixed position-sensitive detector receiving said emitted light.

7. A force sensor for measuring shear forces applied to a sheet of planar material, said force sensor comprising;

a piece of deformable planar material;

a recess formed in said piece of deformable planar material;

a light source mounted in said recess of said piece of deformable material; and a position-sensitive detector mounted adjacent to said recess such that light emitted by said light source impinges on said photo-sensitive detector, whereby shear forces applied to said sheet of planar material cause deformation of said piece of deformable planar material, thus moving an impingement location of light on said position-sensitive detector.

8. The force sensor of claim 7, wherein said light source is an infrared light emitting diode.

9. The force sensor of claim 7, wherein said piece of deformable planar material is formed from a material having a hardness of Shore A 45.

10. The force sensor of claim 7, further including a base plate in which said position-sensitive detector is recessed and to which said piece of deformable planar material is affixed.

11. The force sensor of claim 10, wherein said piece of deformable planar material is affixed over said position-sensitive detector such that an output signal of said position-sensitive detector varies when said shear force is applied to said piece of deformable planar material.

12. The force sensor of claim 11, further including processing circuitry connected to receive said output signals from said position-sensitive detector and to generate signals representative of the magnitude and direction of force and the occurrence of an impact experienced by said force sensor.

13. The force sensor of claim 12, wherein said processing circuitry comprises:

a plurality of current-to-voltage converters for converting said output signals from said force sensor to output voltages;

a difference amplifier for receiving said output voltages and producing a difference signal therefrom;

a computer controlled offset null circuit for receiving said difference signal and for producing a DC signal representative of said shear force experienced by said force sensor; and a filtering circuit for receiving said difference signal and for filtering out a DC component such that an AC signal representative of an impact experienced by said force sensor is produced.

14. The force sensor of claim 7, wherein said force sensor includes two-dimensional position-sensitive detectors.

15. A fingerpad force sensor system for detecting shear forces applied to a workpiece, said system comprising:

a robot having a gripper for holding said workpiece;

at least one fingerpad force sensor affixed to said gripper such that it is positioned between said gripper and said workpiece in order to experience a shear force experienced by said workpiece, each said at least one fingerpad force sensor including a two-dimensional position-sensitive detector and a light emitting source that emits a light that is detected by the position-sensitive detector when said shear force is experienced by said workpiece; and each said at least one fingerpad force sensor being constructed such that it produces at least two output signals representative of the magnitude and direction of said shear force, wherein each of said at least one fingerpad force sensor further comprises:

a first piece of planar material having a first surface for contacting said workpiece and a second surface;

a second piece of planar material having a first portion of dielectric material and a second portion of electrically conductive material, said second piece of planar material being affixed to said second surface of said first piece of planar material by affixing said first portion of dielectric material to said first surface of said first piece of planar material, said light emitting source being affixed to said electrically conductive first portion of said second piece of planar material; and a third piece of deformable planar material having an opening therein for allowing light emitted by said light emitting source to pass therethrough and to be detected by said position-sensitive detector, said third piece of deformable planar material being affixed to said first portion of said second piece of planar material.

16. The force sensor of claim 15, wherein said light emitting source is an infrared light emitting diode.

17. A fingerpad force sensor system for detecting shear forces applied to a workpiece, said system comprising:

a robot having a gripper for holding said workpiece;

at least one fingerpad force sensor affixed to said gripper such that it is positioned between said gripper and said workpiece in order to experience a shear force experienced by said workpiece, each said at least one fingerpad force sensor including a two-dimensional position-sensitive detector and a light emitting source that emits a light that is detected by the position-sensitive detector when said shear force is experienced by said workpiece, and each said at least one fingerpad force sensor being constructed such that it produces at least two output signals representative of the magnitude and direction of said shear force;

processing circuitry connected to receive said at least two output signals from said fingerpad force sensor and to generate signals representative of the magnitude and direction of force and the occurrence of an impact experienced by said fingerpad force sensor; and said processing circuitry comprising a plurality of current-to-voltage converters that convert said at least two output signals from said fingerpad force sensor to output voltages, a difference amplifier that receives said output voltages and produces a difference signal therefrom, a computer controlled offset null circuit that receives said difference signal and produces a DC signal representative of the magnitude and direction of said shear force experienced by said fingerpad force sensor, and a filtering circuit that receives said difference signal and filters out a DC component such that an AC signal representative of an impact experienced by said fingerpad force sensor is produced.

* * * * *

UNITED STATES PATENT AND TRADEMARK OFFICE
CERTIFICATE OF CORRECTION

PATENT NO. : 5,844,146
DATED : December 1, 1998
INVENTOR(S) : Anne M. MURRAY et al.

It is certified that error appears in the above-identified patent and that said Letters Patent is hereby corrected as shown below:

At column 17, line 9 (claim 15, line 9) of the printed patent, "first" should be ---second---.

At column 17, line 16 (claim 15, line 16) of the printed patent, "first" should be ---second---.

Signed and Sealed this

Fifth Day of September, 2000

Attest:

Q. TODD DICKINSON

*Attesting Officer*     *Director of Patents and Trademarks*